Patented Sept. 27, 1938

2,131,120

UNITED STATES PATENT OFFICE

2,131,120

MANUFACTURE OF ORGANIC COMPOUNDS CONTAINING BASIC SUBSTITUENTS

Paul Schlack, Berlin-Treptow, Germany, assignor to I. G. Farbenindustrie Aktiengesellschaft, Frankfort-on-the-Main, Germany, a corporation of Germany No Drawing. Application October 31, 1935, Serial No. 47,637. In Germany November 1, 1934

4 Claims. (Cl. 260—2)

My present invention relates to the manufacture of organic compounds containing basic substituents. It is a continuation-in-part of my application Ser. No. 40,352, filed Sept. 12, 1935.

One of its objects is a process of producing such compounds. Another object are the new compounds obtainable by this process. Further objects will be seen from the detailed specification following hereafter.

Different ways have already been tried for introducing a basic radical into a highly molecular compound particularly into cellulose or a cellulose derivative, essentially for the purpose of providing these materials with an increased affinity for acid dyes. This was obtained by reacting on cellulose or a cellulose derivative with a halogen alkyl amine or, for instance, by esterifying these materials with a halogen fatty acid and exchanging afterwards the halogen for a radical containing basic nitrogen. However, when applying this method to highly molecular compounds particularly to the cellulose derivatives which can easily be hydrolized degraded products are obtained in most cases which have no or only an inferior practical value. When operating with a halogen or a halogenated intermediate product in most cases undesired side reactions occur, for instance, the formation of quaternary ammonium salts instead of tertiary bases. By such side reactions the solubility may be influenced in undesired manner. Also the formation of inorganic by-products is often undesired, even in the case of the formation of neutral compounds such as salts, since the removal is often connected with great difficulties.

I have found that basic groups can be introduced into highly molecular compounds containing a hydroxyl group, a sulfhydryl group, a carboxyl group, an amino group, or an imino group, if they are treated with alkylene oxides which are already basic or with alkylene oxides which obtain basic character by the subsequent addition of an alkyl ester of an organic acid, by hydrolysis or by reduction of highly molecular compounds which may serve as a starting material in accordance with the invention the following are enumerated: cellulose and other polymeric carbohydrates such as for instance sugar and starch, derivatives of polymeric carbohydrates containing free hydroxyl groups, such as partially alkylated cellulose, partially saponified cellulose esters, polymeric carboxylic acids and partially esterified products of polymeric carboxylic acids, for instance, partially saponified polyacrylic acid methylester, partially saponified polyvinyl acetate or partially saponified polyvinyl chloracetate, partially saponified polymerization products from a mixture of a vinyl ester with styrol or acrylic acid nitrile, or vinylchloride; polyvinyl acetal containing hydroxyl groups, novolak-like phenol resins, alkyd-resins containing free hydroxyl groups, resins on the basis of urea, unshaped proteins, such as casein, gelatin or albumen. The products containing an alcoholic or phenolic hydroxyl group are particularly important, because in this case products soluble in organic solvents are easily obtainable.

Alkylene oxides or alkylene oxide derivatives containing atoms or atom groupings of basic character or which by addition of an alkyl ester of an organic acid, by hydrolysis or reduction receive basic character are for instance:

3-diethylamino - 1.2 - epoxypropene, 3 - piperido- 1.2-epoxypropene and its methiodide, 2.3-epoxy-propyltriethyl-ammoniumchloride

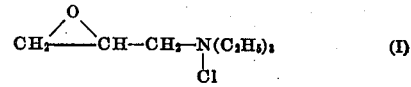

N-acetyl-2.3-epoxypropylmethylamine

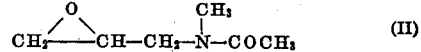

bis-2.3-epoxypropyl-cyclohexylamine

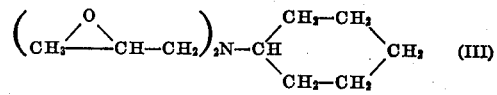

2.3-epoxypropylmethylsulfide

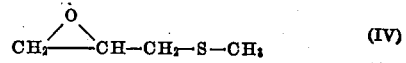

and its methiodide

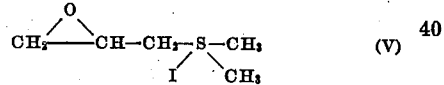

2.3-epoxypropylthioglycolic-acid-ethyl ester

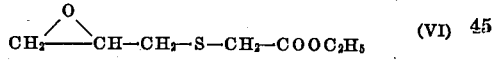

p-nitrophenoxypropenoxide

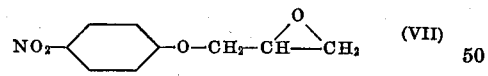

The reactions may in many cases be carried out without the use of a catalyst, particularly in a homogeneous system. If the products have already basic nature, the basic group may hasten the reaction when present in the free state or bound in form of a salt. However, it is advantageous to operate in the presence of an alkaline or acid condensing agent if the further working up is not rendered difficult thereby. Such condensing agents are for instance, diethyl-aniline, pyridine, tripropylamine. The reaction may also be carried out in the presence of a salt, for instance, borax, sodium acetate, magnesium chloride, zinc chloride, ferric chloride, tin chloride, calcium thiocyanate and lithium iodide. If the reactive compounds for instance, the above mentioned bis-2.3-epoxypropylcyclohexylamine (see formula III) contains more than one alkylene oxide group, the reaction may proceed in such a manner that part of the oxide groups is conserved. These may be allowed to interact subsequently with other reactive compounds such as halogen hydracid, hydrogen sulfide a mercaptane, a bisulfide, sulfuric acid, an amine, a diamine or a derivative thereof.

The valuable products, particularly such as are satisfactorily light-proof, are obtained by the application of an amine-oxide of a basic alkylene oxide containing tertiary nitrogen. These products are obtainable in known manner by the reaction of hydrogen peroxide on the tertiary amino group. According to the requirement the oxygen of the N-oxide group can be split off subsequently by a reducing agent whereby the basic character is strongly developed.

The products according to this invention may be used alone or in admixture with other moldable products and thus form a valuable starting material for the production of shaped articles having improved properties particularly as regards their capacity of being dyed. It is also possible to impart basic character to shaped bodies which have no basic character when after-treating the bodies in accordance with the invention. Such shaped articles may be films, threads, or webs of regenerated cellulose, of cotton and other natural cellulose fibers. The relatively low capacity of reaction of such articles is preferably increased by swelling them before the treatment.

The following examples serve to illustrate the invention.

*Example 1.*—A 20 per cent solution of 200 grams of cellulose acetate with a content of acetic acid of 51 per cent, in dioxane are mixed with 40 grs. of piperidopropenoxide and heated for 10 hours at 100° C. The solution which has only slightly darkened is made into films or artificial silk in the usual manner. The product obtained has a strong affinity for many dyes, derivatives of dyes or components of dyes which contain acid groups, for instance, for Orange II, Alizarin direct blue A, Indigosol-Gold-Yellow IGK.

*Example 2.*—A cellulose acetate solution treated in the manner described in Example 1 but with the difference that instead of 40 grs. of piperidopropenoxide there are used 30 grs. of cyclohexyliminodipropenoxide. This solution is made into films by casting. The films have a capacity of being dyed similar to that of the products according to Example 1. The affinity is still increased if the films are after-treated with a 3 per cent aqueous solution of ethylamine for 30 minutes at room temperature.

*Example 3.*—A solution of a cellulose ethyl ether containing about 45 per cent of ethoxyl in dioxane is heated with a quantity of diethylamniopropenoxide calculated on the free hydroxyl groups for 12 hours at 100° C. Films or threads made from the product of reaction by the dry spinning process or the wet spinning process can be intensely dyed with acid dyes.

*Example 4.*—The cellulose ethylether of Example 3 is replaced by partially saponified polyvinylacetate. The oxybase obtained is soluble in many organic solvents but also in diluted acid and can be used as an aid, particularly as an aid in dyeing or printing, as an addition to spinning solutions and casting solutions or the like.

*Example 5.*—A web of viscose artificial silk is swollen in a caustic soda solution of $n$ strength, washed with cold water while maintaining the swollen condition and then treated with a 10 per cent solution of morpholidopropenoxide for 8 hours at 50° C. The affinity to acid dyes is extraordinarily increased. The treatment can also be applied locally, eventually together with the interaction of a dye. Mixed webs from wool or viscose artificial silk may be treated in the same or similar manner, whereupon a satisfactorily uniform colouring is obtained with acid dyes. Also when omitting the swelling treatment strong effects are produced.

*Example 6.*—An artificial resin from the novolac type obtained by condensation of phenol with formaldehyde in the presence of hydrochloric acid is reacted on with diacylaminopropenoxide in a slight excess when calculated on the hydroxyl groups present in the resin, in dioxane solution at 110° C. The product of reaction is easily soluble in dilute acetic acid. It may be added to a spinning solution for the manufacture of cellulose acetate artificial silk in order to increase its capacity of being dyed.

*Example 7.*—An artificial resin of the novolac type made from phenol and formaldehyde is heated with the aminoxide compound obtained by the addition of hydrogen peroxide to piperidopropenoxide in dioxane. The obtained product is fairly light-proof and can be used for the same purpose as the product described in Example 6.

*Example 8.*—To a solution of casein obtained in the presence of borax or sodium tetra borate there is added a quantity of piperidopropenoxide in a quantity corresponding with the content of basic groups of the casein. The oxide is rapidly consumed and there is obtained a product which is easily soluble in dilute acetic acid and has a high affinity for dyes.

*Example 9.*—In the same manner as described in Example 5 a previously swollen cellulose is reacted on with piperidopropenoxide and subsequently acetylated in the usual manner; the acetone soluble product obtained after partial hydrolysis can be worked up into artificial silk which is strongly dyed by many acid dyes. The cellulose treated with piperidopropenoxide can also be directly made into cellulose artificial silk according to the known processes.

*Example 10.*—A solution of cellulose acetate containing 50 per cent of acetic acid, in acetone of 90 per cent strength is heated in the presence of 2 per cent of lithium iodide with 25 per cent of dibutyl-aminopropenoxide for 10 hours at 70° to 105° C. A film made from this solution has a high affinity for acid dyes, for instance, to Fast-Red A V.

*Example 11.*—10 parts of toluene sulfopolyglycid in butanol solution are heated with two molecular proportions of potassium sulfhydrate calculated on one toluene sulfo-group with the exclusion of air at 100° C. until no potassium toluene sulfonate separates any longer. The excess of hydrogen sulfide is driven out by nitrogen, and the equivalent amount of piperidopropenoxide methiode is added. Potassium chloride separates and a basic artificial resin is produced which is soluble in water particularly after the addition of an acid and which intensely fixes acid and substantive dyes.

*Example 12.*—A 10 per cent solution of cellulose acetate containing 52 per cent of acetic acid, in acetone of 95 per cent strength is heated with 20 per cent of glycidthiomethylether and 2 per cent of zinc chloride both compounds being calculated on the applied cellulose acetate, for 4 hours at 90° C. and 4 hours at 105° C. There is then added 20 per cent of methyliodide and the mass is heated for 6 hours at 100° C. in an autoclave provided with an agitator. The precipitated product has a strong affinity for acid dyes such as Orange II.

*Example 13.*—A solution of the phenol-resin described in Example 6 in alcohol of 90 per cent strength is boiled for 8 hours with a slight excess of 3-acetyl-amino-1.2-propenoxide in the presence of 1 per cent of potassium acetate. After the addition of one equivalent proportion of sodium hydroxide the mass is heated for further 2 hours for splitting off the acetyl group. The product of reaction is soluble in acetic acid of 60 per cent strength and precipitates acid or substantive dyes. The acetylaminopropenoxide is obtainable by acetylation of chloroxypropylamine hydrochloride with acetic anhydride in the presence of sodium bicarbonate and subsequently splitting off halogen hydracid from the reaction product with the calculated quantity of a solution of potassium hydroxide of double normal strength.

The process of producing compounds in accordance with this invention from naturally or artificially shaped products of protein, derivatives of proteins and conversion products of protein have already been described and claimed in my co-pending application Ser. No. 40,352 filed Sept. 12, 1935, and are not claimed herein.

What I claim is:

1. A process of producing basic polymeric carbohydrates, which comprises reacting a hydroxyl-containing polymeric carbohydrate with an alkylene oxide having in its molecule, besides an alkylene oxide group, a basic nitrogen atom.

2. A process of producing a basic cellulose derivative, which comprises reacting viscose artificial silk in swollen condition with morpholidopropenoxide.

3. A process of producing a basic cellulose derivative, which comprises reacting a solution of cellulose acetate containing about 51 per cent of acetic acid with piperidopropenoxide.

4. A process of producing a basic cellulose derivative, which comprises reacting a solution of cellulose ethyl ether containing about 45 per cent of ethoxyl with diethylaminopropenoxide.

PAUL SCHLACK.